United States Patent
Hambling et al.

(10) Patent No.: US 11,752,696 B2
(45) Date of Patent: Sep. 12, 2023

(54) SYSTEM FOR ADDITIVELY MANUFACTURING COMPOSITE STRUCTURES

(71) Applicant: Continuous Composites Inc., Coeur d'Alene, ID (US)

(72) Inventors: Colin Hugh Hambling, Medina, WA (US); Trevor David Budge, Coeur d'Alene, ID (US); Ryan C. Stockett, Spokane, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 0 days.

(21) Appl. No.: 17/457,938

(22) Filed: Dec. 7, 2021

(65) Prior Publication Data

US 2022/0088864 A1 Mar. 24, 2022

Related U.S. Application Data

(63) Continuation of application No. 16/546,288, filed on Aug. 20, 2019, now Pat. No. 11,235,522.

(60) Provisional application No. 62/769,498, filed on Nov. 19, 2018, provisional application No. 62/741,124, filed on Oct. 4, 2018.

(51) Int. Cl.
*B29C 64/209* (2017.01)
*B29C 64/264* (2017.01)
*B29C 64/241* (2017.01)
*B33Y 30/00* (2015.01)
*B29C 64/106* (2017.01)

(52) U.S. Cl.
CPC .......... *B29C 64/209* (2017.08); *B29C 64/241* (2017.08); *B29C 64/264* (2017.08); *B29C 64/106* (2017.08); *B33Y 30/00* (2014.12)

(58) Field of Classification Search
CPC ... B29C 64/209; B29C 64/264; B29C 64/241; B29C 64/106; B33Y 10/00; B33Y 30/00
See application file for complete search history.

(56) References Cited

U.S. PATENT DOCUMENTS

| 3,286,305 A | 11/1966 | Seckel |
| 3,809,514 A | 5/1974 | Nunez |

(Continued)

FOREIGN PATENT DOCUMENTS

| DE | 4102257 A1 | 7/1992 |
| EP | 2589481 B1 | 1/2016 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Joseph S Del Sole
*Assistant Examiner* — Jamel M Nelson
(74) *Attorney, Agent, or Firm* — Ryan Stockett (57) ABSTRACT

A head is disclosed for an additive manufacturing system. The head may include a first outlet configured to discharge a composite material to form an object. The head may also include a second outlet located upstream of the first outlet and configured to discharge fewer than all components of the composite material.

9 Claims, 4 Drawing Sheets

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,188,075 B1 | 2/2001 | Takayama et al. |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 10,647,058 B2 | 5/2020 | Tyler et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0078361 A1 | 3/2009 | Kisch et al. |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2014/0328963 A1 | 11/2014 | Mark et al. |
| 2015/0136455 A1 | 5/2015 | Fleming |
| 2015/0217517 A1 | 8/2015 | Karpas et al. |
| 2015/0251409 A1 | 9/2015 | Ohnishi |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1* | 2/2017 | Evans ............... B29C 64/165 |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |

(56) References Cited

U.S. PATENT DOCUMENTS

| | | |
|---|---|---|
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0050502 A1 | 2/2018 | Oldani |
| 2018/0272622 A1 | 9/2018 | Dawson et al. |
| 2018/0297289 A1 | 10/2018 | Barbati et al. |
| 2019/0047219 A1 | 2/2019 | Chesser et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 1992012183 A1 | 7/1992 |
| WO | 1998014485 A1 | 4/1998 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruwelt, M. S. Johnson, & A. C. Long, Curing of Composite Components by Ultraviolet Radiation: A Review, Polymer Composites, pp. 119-128 (Apr. 2006).

AZOM, Electron Beam Curing of Composites, AZO Materials, Sep. 7, 2001.

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Coqueret, Recent advances in electron-beam curing of carbon fiber-reinforced composites, Radiation Physics and Chemistry, vol. 78, Issues 7-8, Jul.-Aug. 2009, pp. 557-561.

Crivello, The electron beam-induced cationic polymerization of epoxy resins, Journal of Applied Polymer Science, Jan. 5, 1992, vol. 44, Issue1, pp. 9-16.

ebeamservices.com, Why use electron beam treatment curing for reinforced plastics or composites?, Ask Karen.

Hay, O'Gara, Recent developments in thermoset curing methods, Proceedings of the Institution of Mechanical Engineers, Part G: Journal of Aerospace Engineering, Mar. 1, 2006, vol. 220 Issue: 3, pp. 187-195.

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Janke, Electron Beam Cured Epoxy Resin Composites for High Temperature Applications, Physics and Process Modeling (PPM) and Other Propulsion R and T, Apr. 1, 1997, Paper-4—vol. 1, NASA Lewis Research Center; Cleveland, OH United States.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

Singh, Electron processing of fibre-reinforced advanced composites, Radiation Physics and Chemistry, vol. 48, Issue 2, Aug. 1996, pp. 153-170.

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

V.J Lopata, D.R. Sidwell, Electron Beam Processing for Composite Manufacturing and Repair, Radtech Report, Sep./Oct. 2003, pp. 1-11.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

SYSTEM FOR ADDITIVELY MANUFACTURING COMPOSITE STRUCTURES

RELATED APPLICATIONS

This application is a continuation of U.S. application Ser. No. 16/546,288 that was filed on Aug. 20, 2019, which is based on and claims the benefit of priority from U.S. Provisional Application No. 62/741,124 that was filed on Oct. 4, 2018 and Provisional Application No. 62/769,498 that was filed on Nov. 19, 2018, the contents of all of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic (e.g., solid or liquid), a powdered metal, a thermoset resin (e.g., a UV curable, heat curable, and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543, which issued to Tyler on Dec. 6, 2016 ("the '543 patent").

Although CF3D® provides for increased strength, compared to manufacturing processes that do not utilize continuous-fiber reinforcement, improvements can be made to the structure and/or operation of existing systems. The disclosed additive manufacturing system is uniquely configured to provide these improvements and/or to address other issues of the prior art.

SUMMARY

In one aspect, the present disclosure is directed to a head for an additive manufacturing system. The head may include an outlet configured to discharge a continuous reinforcement at least partially coated in a liquid matrix. The head may also include a low-pressure port located upstream of the outlet and configured to draw out only liquid matrix.

In another aspect, the present disclosure is directed to an additive manufacturing system. The system may include a print head configured to discharge a continuous reinforcement at least partially coated with a liquid matrix. The print head may have at least one low-pressure port located upstream of an outlet. The system may also include a pump fluidly connected to the low-pressure port and configured to drawn liquid matrix through the low-pressure port, a support configured to move the print head during discharging, and a controller in communication with the print head, the support, and the pump. The controller may be configured to adjust a pressure applied to the low-pressure port by the pump during multiple modes of operation.

In yet another aspect, the present disclosure is directed to another additive manufacturing system. This system may include a print head configured to discharge a continuous reinforcement at least partially coated with a liquid matrix, a support configured to move the print head during discharging, and a controller in communication with the print head and the support. The controller may be configured to cause the support to move the print head during fabrication of overlapping layers within a structure, to selectively cause the support to move the print head to different locations during transitions between the overlapping layers, and to selectively cause the support to move the print head along a helical path during the transitions.

DETAILED DESCRIPTION

Figure 1:
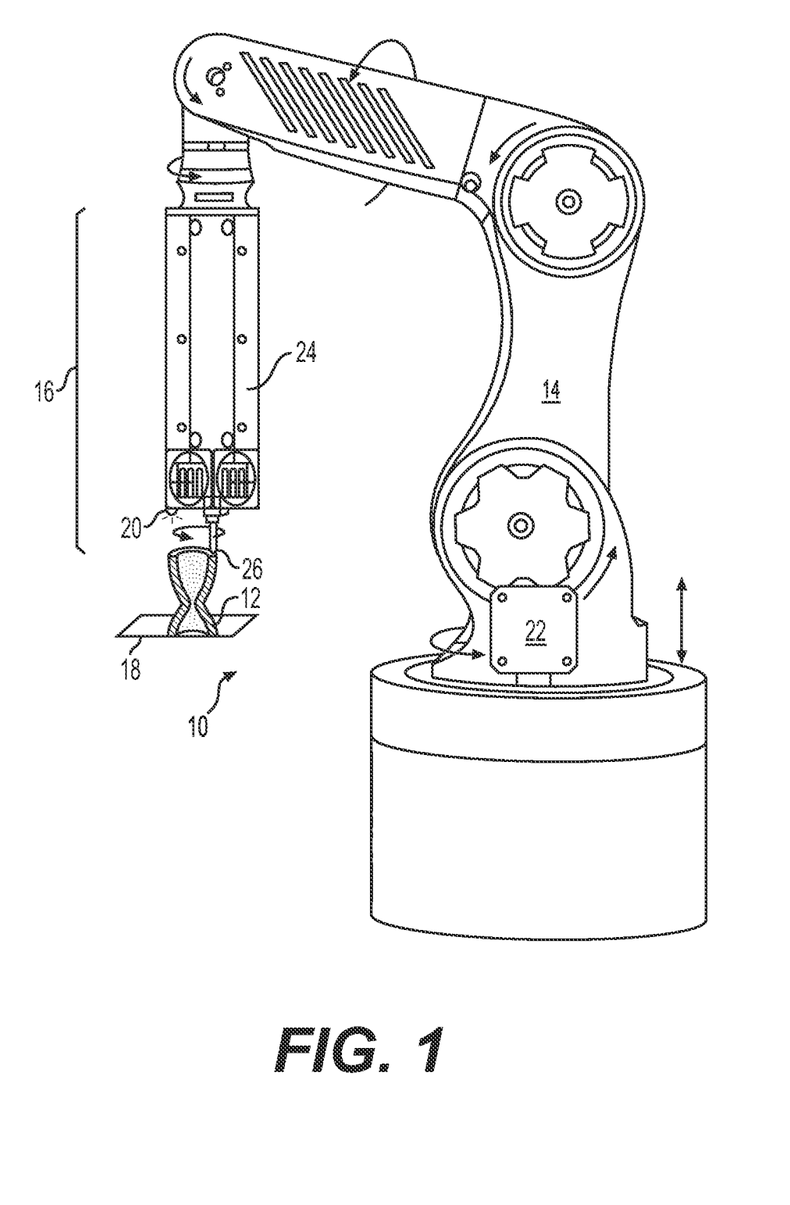
FIG. 1 is an isometric illustration of an exemplary disclosed additive manufacturing system.

FIG. 1 illustrates an exemplary system 10, which may be used to manufacture a composite structure 12 having any desired cross-sectional shape (e.g., ellipsoidal, polygonal, etc.). System 10 may include at least a moveable support 14 and a print head ("head") 16. Support 14 may be coupled to and configured to move head 16. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be a gantry, a hybrid gantry/arm, or another type of movement system that is capable of moving head 16 in multiple directions during fabrication of structure 12. Although support 14 is shown as being capable of multi-axis movement (e.g., movement about six or more axes), it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; a solid filament; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for similar reasons. In either situation, head 16 may be specially configured (e.g., insulated, temperature-controlled, shielded, etc.) to provide for these needs.

The matrix may be used to coat, encase, or otherwise at least partially surround or saturate (e.g., wet) any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools) or otherwise passed through head 16 (e.g., fed from one or more external spools). When multiple reinforcements are simultaneously used, the reinforcements may be of the same type and have the same diameter and cross-sectional shape (e.g., circular, square, flat, hollow, solid, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., at least partially coated or impregnated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory (e.g., by creating moments that oppose gravity).

The reinforcement may be pulled from head 16 as a result of head 16 moving away from an anchor point 18. In particular, at the start of structure-formation, a length of matrix-impregnated reinforcement may be pulled and/or pushed from head 16, deposited onto a stationary or moveable anchor point 18, and cured, such that the discharged material adheres to anchor point 18. Thereafter, head 16 may be moved away from anchor point 18, and the relative movement may cause additional reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement.

Any number of reinforcements may be passed axially through head 16 and be discharged together with at least a partial coating of matrix. At discharge (or shortly thereafter), one or more cure enhancers (e.g., one or more light sources, ultrasonic emitters, lasers, heaters, catalyst dispensers, microwave generators, etc.) 20 may expose the matrix coating to a cure energy (e.g., light energy, electromagnetic radiation, vibrations, heat, a chemical catalyst or hardener, or other form of actively-applied energy). The cure energy may trigger a chemical reaction, increase a rate of chemical reaction already occurring within the matrix, sinter the material, harden the material, or otherwise cause the material to cure as it discharges from head 16.

A controller 22 may be provided and communicatively coupled with support 14, head 16, and/or any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

Head 16 may be an assembly of multiple components that cooperate to discharge matrix-coated reinforcements. These components may include, among other things, a matrix reservoir 24 and an outlet (e.g., a nozzle) 26. Matrix reservoir 24 may be configured to hold a finite supply of matrix material sufficient to wet a desired length of reinforcements passing therethrough. In some embodiments, matrix reservoir 24 may be automatically replenished with matrix (e.g., based on a sensed amount of matrix remaining in reservoir 24). Outlet 26 may be located at a discharge end of matrix reservoir 24 and configured to receive the matrix-coated reinforcements therefrom. Cure enhancer(s) 20 may be mounted at the discharge end of matrix reservoir 24 and adjacent (e.g., at a trailing edge of or around) outlet 26.

In one embodiment, matrix reservoir 24 may be configured to expose the reinforcements to the matrix under conditions sufficient to adequately wet (e.g., to fully saturate) the reinforcements during travel through matrix reservoir 24. For example, a length, internal diameter, volume, pressure, trajectory, temperature, flow pattern, etc. of reservoir 24 may be selected such that, even at a highest rate of discharge, the reinforcements passing through matrix reservoir 24 are wetted to a desired degree by the matrix.

Figure 2:
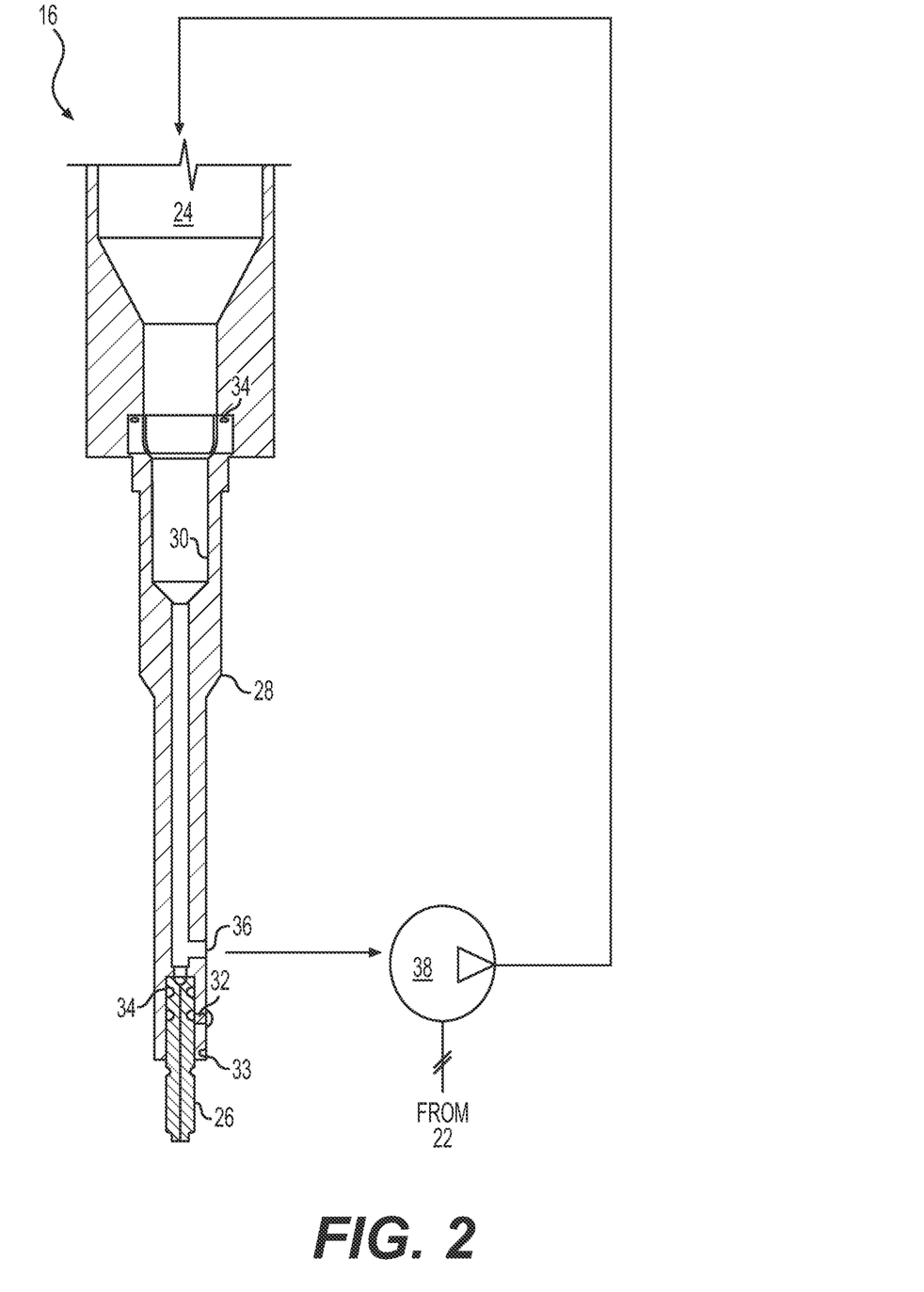
FIG. 2 is a cross-sectional and diagrammatic illustration of an exemplary disclosed print head that may be utilized with the system of FIG. 1.
Figure 3:
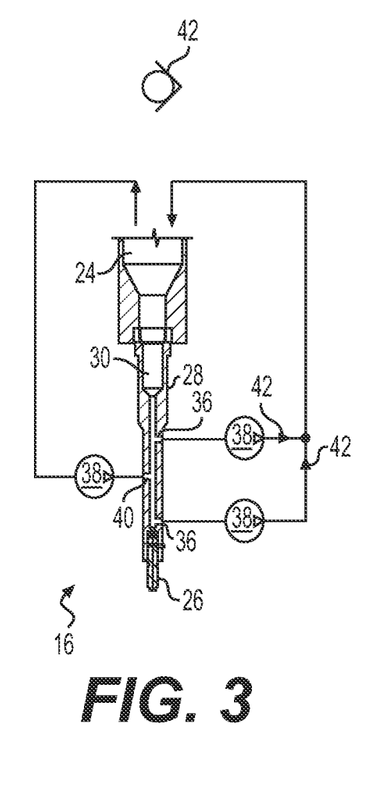
FIGS. 3-6 are cross-sectional and diagrammatic illustrations of additional exemplary disclosed print heads that may be utilized with the system of FIG. 1.

In other embodiments (e.g., as shown in FIG. 2), however, an extension 28 may be connected between matrix reservoir 24 and outlet 26 to allow the reinforcements to be exposed to the matrix for a greater amount of time prior to the reinforcements passing through outlet 26. As shown in FIG. 2, extension 28 may be fluidly connected to the volume inside of matrix reservoir 24, and have an internal diameter greater than an outer diameter of the reinforcements passing therethrough. The larger diameter of extension 28 may be designed to hold a desired amount of excess matrix (e.g., more matrix than required to fully wet the reinforcements) around the outside side of the reinforcements. In one example, the internal diameter of extension 28 may be about 1.0 to 1.5 times larger than the outer diameter of the reinforcements. While there is no maximum limit to this internal diameter, a smaller internal diameter may allow for a reduced outer form factor and access to tighter spaces between features of structure 12. A length of extension 28 may be variable and selected for particular applications to help ensure a long enough dwell time of the reinforcements within the matrix for a maximum discharge rate. In one example, the length of extension 28 can be represented by the following equation:

$$V_r(T_{wet}) = L \qquad \text{EQ1}$$

Wherein:

$V_r$ is the linear speed of the reinforcement passing through head 16;

$T_{wet}$ is the time required for a particular size, shape, and composition of reinforcement to be wetted with a particular matrix by a desired amount; and L is a combined length of wetted travel (e.g., length of reservoir 24 and extension 28) through which the reinforcement travels.

It is contemplated that the length of extension 28 may also be increased to provide for a slimmer form factor, in some applications. This may be true even when the associated increase in internal volume is not necessary to fully wet the reinforcements.

In one embodiment, extension 28 has a stepped interior bore 30. For example, bore 30 may have a greater diameter at a base end adjacent matrix reservoir 24, and a smaller diameter at a distal or tip end adjacent outlet 26. The larger diameter may taper to the smaller diameter at a location about $\frac{1}{3}^{rd}$ to $\frac{1}{4}^{th}$ of the distance from the base end to the tip end. The larger diameter of extension 28 may be smaller than an internal diameter of matrix reservoir 24, while the smaller diameter of extension 28 may be larger than an internal diameter of outlet 26. It is contemplated that bore 30 could alternatively have a generally constant diameter, if desired, that is smaller or larger than the diameters of matrix reservoir 24 and/or outlet 26.

In the embodiment of FIG. 2, outlet 26 may be removably connected to extension 28. For example, a set screw 32 may be used to attach outlet 26 within a countersink 33 at the tip end of extension 28. In this way, different outlets (e.g., different nozzles) 26 having differing configurations (e.g., single channel, multi-channel, channels of differing internal diameters, channels of different shapes and geometries, etc.) may be swapped out for different applications, without having to use different extensions 28. It is contemplated, however, that extension 28 may also be removably connected to matrix reservoir 24 (e.g., via threaded fastening, set screws, etc.), such that longer or shorter extensions 28 having larger or smaller internal volumes and associated form factors may be selectively used for particular applications. One or more seals (e.g., o-rings) 34 may be disposed annularly between outlet 26 and extension 28 and/or between extension 28 and matrix reservoir 24 to inhibit undesired leakage of matrix from head 16.

In the disclosed embodiment, extension 28 is fabricated from a rigid material. For example, extension 28 may be fabricated from stainless steel or aluminum. It is contemplated, however, that extension 28 could be somewhat flexible in some situations. Outlet 26 may be fabricated from a lower-friction material than extension 28. For example, some (e.g., internal surfaces only) or all of outlet 26 may be fabricated from Nylon, Dacron® (e.g., polyethylene terephthalate), Teflon® (e.g., PTFE), or another low-friction material known in the art.

As also shown in FIG. 2, the exposure of the reinforcement to matrix within extension 28 may be actively controlled, if desired. For example, one or more ports (e.g., radially oriented ports) 36 may be formed within extension 28 and used to direct matrix into and/or out of extension 28 in a desired manner (e.g., in a desired flow direction, at a desired rate, with a desired pressure or temperature, etc.). In the disclosed embodiment, a single port 36 is included and located at the tip end of extension 28. In this embodiment, a pump 38 is fluidly connected to port 36 and used to draw excess matrix from extension 28 before the matrix can enter outlet 26. This matrix can either be discarded or recycled back into matrix reservoir 24, as desired. It is contemplated that the low-pressure applied to port 36 by outlet pump 38 may be adjustable and coordinated with a rate of travel of the reinforcement through head 16 (e.g., the discharge rate of wetted reinforcement through outlet 26). Additionally or alternatively, the low-pressure may be coordinated with an assumed and/or measured condition (e.g., a saturation level) of the wetted reinforcement. It may even be possible, in some embodiments, to completely reverse the flow of matrix through pump 38, such that pump suction 38 pushes matrix into extension 28 via port 36. Alternatively, an additional port (not shown) may be used to provide additional matrix into extension 28.

It is contemplated that outlet pump 38 may be regulated differently based on a current operation of head 16, if desired. For example, pump 38 may operate in a first mode during anchoring of the matrix-wetted reinforcement, operate in a second mode during normal discharge (e.g., during discharge along a generally straight tool path) of material, operate in a third mode during abnormal discharge (e.g., during discharge along a curving or cornering tool path), and/or operate in a fourth mode when head 16 is not discharging material (e.g., between print operations). These different modes of operation may be associated with higher or lower pressures being applied to port 36 by pump 38, such that the reinforcement is saturated with a greater or lesser amount of matrix and/or such that matrix is inhibited from leaking from outlet 26 when reinforcement is not being discharged. For example, the pressure may be lowest (or non-existent) during anchoring, such that a greater amount of matrix is discharged with the reinforcement, resulting in a stronger anchor. In another example, the pressure may be higher during discharge along the generally straight tool path, thereby providing a lower amount of matrix. The pressure may be at a midlevel during travel along a curved tool path, and highest when head 16 is not discharging material at all. The operation of pump 38 and corresponding pressure may be regulated by controller 22 in a feedforward manner (e.g., based on a tracked progress of head 16 through a program of tool paths) and/or in a feedback manner (e.g., based on a comparison of a monitored and a desired amount of matrix coating the reinforcements during discharge). Other strategies may also be employed. Any number of sensors (not shown) may be used for these control strategies and located anywhere within, on, or near head 16.

FIGS. 3-6 illustrate alternative embodiments and arrangements of extension 28 that are similar to that illustrated in FIG. 2. For example, the embodiments and arrangements illustrated in FIGS. 3-6 include extension 28 positioned between matrix reservoir 24 and outlet 26, and at least one outlet port 36 providing access of bore 30 to pump 38. In contrast to the embodiment of FIG. 2, the embodiments and arrangements of FIGS. 3-6 include at least two outlet ports 36 that can be used for removal of excess matrix, and at least one inlet port 40 that can be used for supply of pressurized matrix.

As shown in FIGS. 3-6, outlet ports 36 may be generally spaced apart from each other along an axial length of extension 28, and inlet port 40 may be located between (e.g., fluidly connected between) outlet ports 36. One or more outlet pumps 38 may be associated with outlet ports 38, and a inlet pump 38 may be associated with inlet port 40. With this configuration, matrix may be introduced (e.g., for the first time or as a supplement to the matrix in reservoir 24) into extension 28 and flow axially toward reservoir 24 and/or toward outlet 26 before being drawn out of extension 28. One or more check valves 42 may be strategically placed to ensure unidirectional flow through the pumps 38 and the associated passages.

It is contemplated that all of pumps 38 may be operational at the same time, that only inlet pump 38 and one of outlet pumps 38 may be simultaneously operable, that only outlet pumps 38 may be simultaneously operational, that only inlet pump 38 may be operational, or than only one of outlet pumps 38 may be operational. When both outlet pumps 38 and inlet pump 38 are operational at the same time, the matrix may flow a greater axial distance inside of extension 28, allowing for greater saturation of the passing reinforcement. When only one of outlet pumps 38 is operational, the axial flow distance may be reduced (e.g., cut in half), which may result in less saturation. When an axial flow of matrix is in a direction opposite to a normal travel direction of the reinforcement through extension 28 (e.g., when the matrix flows from inlet pump 38 to the outlet pump 38 nearest matrix reservoir 24), a greater level of saturation may occur than when the matrix flow is in the same direction as the reinforcement travel. Accordingly, by varying which of pumps 38 are simultaneously operational, multiple levels of reinforcement saturation may be possible.

In some applications, particular pumps 38 may be selectively activated based on an orientation of head 16 relative to the pull of gravity. For example, when head 16 is in the orientation shown in FIGS. 3-6, only outlet pump 38 associated the outlet port 36 adjacent the tip end of outlet 26 may be actively drawing fluid, as the fluid would otherwise tend to drip unintentionally through outlet 26. Likewise, when head 16 is rotated through about 180° for upside-down printing, only outlet pump 38 associated the outlet port 36 adjacent reservoir 24 may be actively drawing fluid to avoid pooling inside of extension 28. It is contemplated that both outlet pumps 34 may be active during these operations, even though only one of the pumps may be drawing fluid due to the elevated pressure head associated with the pump located gravitationally higher.

Pumps 38 may be regulated differently based on a current operation of head 16, if desired. For example, pumps 38 may operate in a first mode during anchoring of the matrix-wetted reinforcement, operate in a second mode during normal discharge (e.g., during discharge along a generally straight tool path) of material, operate in a third mode during abnormal discharge (e.g., during discharge along a curving or cornering tool path), and/or operate in a fourth mode when head 16 is not discharging material (e.g., between print operations). These different modes of operation may be associated with higher or lower pressures being applied to ports 36 and/or 40, such that the reinforcement is saturated with a greater or lesser amount of matrix and/or such that matrix is inhibited from leaking from outlet 26 when reinforcement is not being discharged.

It is also contemplated that inlet pump 38 may be omitted, if desired, and that one or both of the outlet pumps 38 may be sufficient to pull matrix from an associated static supply (e.g., from reservoir 24 or another onboard or offboard tank) and extension 28. It is further contemplated that reservoir 24 could be eliminated, if desired, such that the only source of matrix is inlet pump 38 and/or the onboard or offboard tank.

The matrix drawn from extension 28 can either be discarded or recycled back into matrix reservoir 24 (or the other onboard or offboard tank), as desired. It is contemplated that the pressures applied to ports 36 and/or 40 by pumps 38 may be adjustable and coordinated with a rate of travel of the reinforcement through head 16 (e.g., the discharge rate of wetted reinforcement through extension 28). Additionally or alternatively, the pressures may be coordinated with an assumed and/or measured condition (e.g., saturation level) of the wetted reinforcement. It may even be possible, in some embodiments, to completely reverse the flow of matrix through ports 36, 40.

Figure 4:
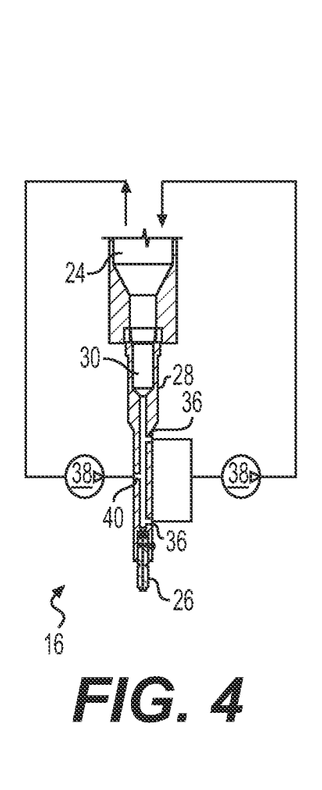

In some embodiments, a lesser number of pumps 38 may result in a simpler and less expensive system. FIG. 4 illustrates an embodiment, where a single outlet pump 38 is fluidly connected to both of outlet ports 36. In this configuration, the flows of matrix may be continuous throughout operation of head 16, regardless of head orientation. This may require greater pressures from pumps 38, but the associated configuration and control may be less complex.

Figure 5:
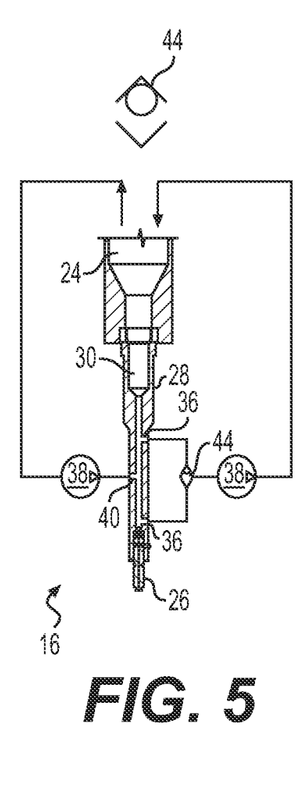

FIG. 5 illustrates another embodiment of head 16. Like head 16 of the embodiment of FIG. 4, head 16 of the embodiment of FIG. 5 may include a single inlet pump 38 and a single outlet pump 38. Head 16 of FIG. 5 may also include a shuttle valve 44 that functions, based on a pressure differential, to fluidly connect only one of the outlet ports 36 (e.g., the port having the greater pressure) with outlet pump 38. In this embodiment, matrix may flow in only one direction through extension 28 at any given time. This may help to reduce the pressures required of pumps 38.

Figure 6:
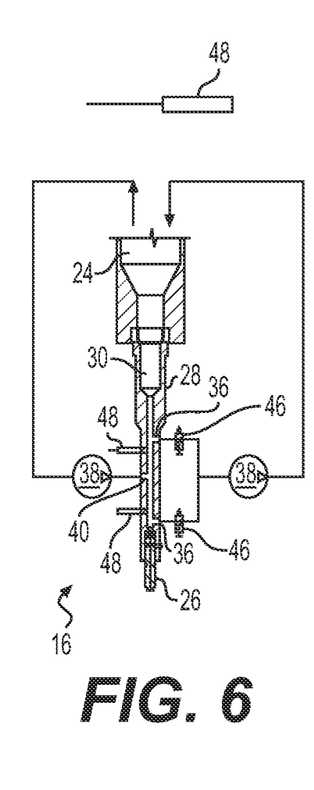

FIG. 6 illustrates another embodiment of head 16. Like head 16 of the embodiment of FIGS. 4 and 5, head 16 of the embodiment of FIG. 6 may include a single inlet pump 38 and a single outlet pump 38. Head 16 of FIG. 6, however, may have one or more solenoid-operated valves 46 in place of shuttle valve 44. Each valve 46 may be disposed between outlet pump 38 and associated one of outlet ports 36. Valve 46 may be moveable from a first position at which the associated port 36 is blocked, to a second position at which the associated port 36 is unblocked. Movement between the two positions may be controlled (e.g., by controller 22—referring to FIG. 1) based on sensed pressures and/or orientations of head 16. For example, one or more sensors 48 may be configured to generate signals indicative of a detected presence of matrix, a pressure of the matrix, and/or an associated orientation of head 16. When the signals indicate the presence of matrix near a particular outlet port 36 (or a higher pressure of matrix or a gravitationally lower orientation), the valve 46 associated with that port 36 may open and allow the matrix to be drawn from extension 28 by outlet pump 38. This electronic configuration of FIG. 6 may be more accurate and/or responsive, compared to the hydraulic configuration of FIG. 5.

Figure 7:
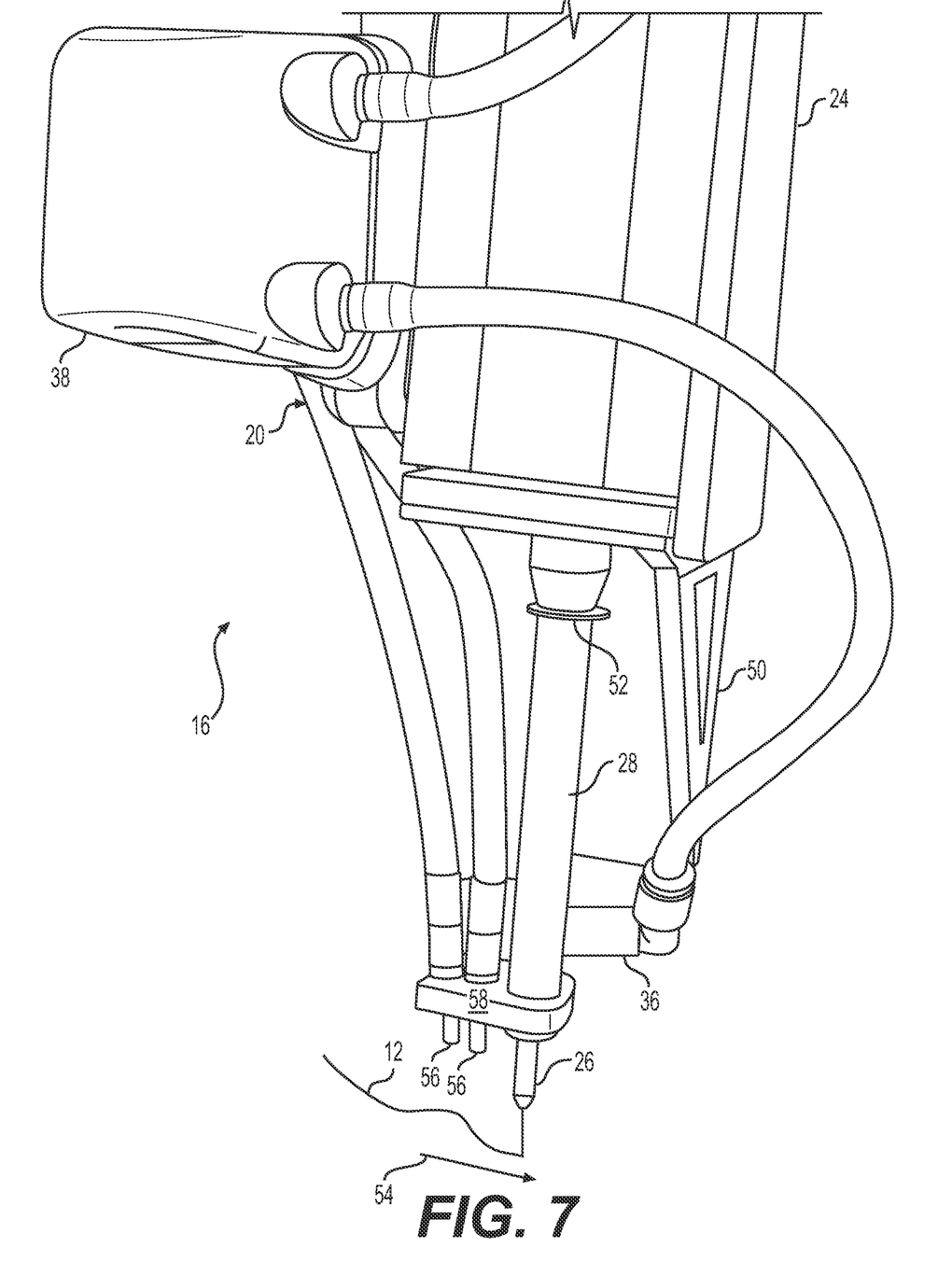
FIG. 7 is an isometric illustration of another exemplary disclosed print head that may be utilized with the system of FIG. 1.

As shown in FIG. 7, a bracket 50 may be used in some instances (e.g., depending on a length of extension 28) to stabilize extension 28. Bracket 50 may mount to the discharge end of matrix reservoir 24, and include one or more collars 52 that engage extension 28. In the disclosed embodiment, bracket 50 has a generally triangular cross-section, and connects to extension 28 at a side of extension 28, relative to a travel direction indicated by an arrow 54.

As also shown in FIG. 7, depending on a length of extension 28, the energy from cure enhancer(s) 20 may need to be relocated closer to outlet 26 and/or focused to improve curing of the matrix-wetted reinforcements. In the disclosed embodiment, one or more fiber optic tubes 56 are used to direct and/or focus UV light from cure enhancer(s) 18 to a trailing side of outlet 26. For example, two fiber optic tubes 56 may be utilized and oriented sequentially relative to the travel direction of outlet 26.

Tubes 56 may extend from different cure enhancers 20 and expose the matrix in the discharging materials to different types and/or levels of cure energy. In one example, the tube 56 located immediately adjacent outlet 26 provides a type and/or level of energy (e.g., UV light) sufficient only to cure an outer shell of the matrix and hold the discharging materials at a desired location. In this example, the tube 56 located further away from outlet 26 provides a type and/or level of energy (e.g., laser light and/or infrared heat) sufficient to through-cure the discharging materials). It is contemplated that tubes 56 may be made from the same or different materials and have the same or different geometries.

A bracket 58 may be used to locate and orient the terminal ends of tube(s) 56. In the disclosed embodiment, bracket 58 connects tubes 56 to the discharge end of extension 28 and orients tubes 56 in a plane passing through the travel direction of the reinforcement and the axis of extension 28 and angled away from outlet 26. This orientation may inhibit the energy in tubes 56 from impinging outlet 26. That is, the axes of tubes 56 may be angled away from the axis of extension 28 and/or outlet 26 by about 1-20° (e.g., about 10°).

It is contemplated that the terminal ends of tubes 56 may be located at about the same axial distance from the discharging material or at different axial distances, as desired. For example, the tube 56 closest to outlet 26 may be located closer to the discharging material than the tube 56 located further from outlet 26. This may allow for the cure energy from the further tube 56 to be cast over a wider area. It is also contemplated that a location, angle, and/or energy intensity of tubes 56 may be adjusted dynamically (e.g., based on a travel speed, discharge rate, and/or orientation of head 16) during operation of head 16, if desired.

INDUSTRIAL APPLICABILITY

The disclosed systems may be used to additively manufacture composite structures having any desired cross-sectional shape and length. The composite structures may include any number of different fibers of the same or different types and of the same or different cross-sectional sizes and shapes, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, reinforcement information (e.g., types, sizes, shapes, performance characteristics, densities, and trajectories), matrix information (e.g., type, cure requirements, performance characteristics), etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

To install the reinforcements, individual fibers, tows, and/or ribbons may be passed through head 16 (e.g., through reservoir 24, extension 28, and outlet 26. Installation of the matrix material may include filling matrix reservoir 24 and/or activating pumps 38.

The component information may then be used to control operation of system 10. For example, particular reinforcements may be pulled and/or pushed along with a particular matrix material from head 16 in desired amounts and/or at desired rates. Support 14 may also selectively move head 16 and/or anchor point 18 in a desired manner, such that an axis of the resulting structure 12 follows a desired three-dimensional trajectory. Cure enhancer(s) 20 may be selectively activated during material discharge, such that the matrix cures at least enough to maintain a shape of structure 12. Once structure 12 has grown to a desired length, structure 12 may be severed from system 10 via cutting mechanism 58.

In some applications, the use of cure enhancers 20, pumps 38, and other related electrical and/or hydraulic auxiliary devices (e.g., sensors, cameras, etc.) mounted to head 16 may require careful management of associated tethers (e.g., supply lines, power lines, communication lines, etc.). For example, during printing of a generally cylindrical structure 12 (shown in FIG. 1), head 16 may be caused to spin around its axis during printing, resulting in twisting of the associated tethers. System 10 may be able to accommodate only a finite number of these twists, before difficulties (e.g., malfunctions, deviations, failures, accuracy errors, etc.) occur. Accordingly, during fabrication of structure 12, head 16 may need to be periodically counterrotated to untwist the associated tethers.

It has been found that, if the counterrotation of head 16 is performed repeatedly at the same general angle around the perimeter of structure 12, discontinuities associated with the counterrotation tend to align between layers of structure 12. For example, extra matrix may leak from outlet 26 during the counterrotation and, when the angle of each counterrotation aligns, structure 12 may end up with too much matrix at one side. These aligned discontinuities can imbalance structure 12 and/or affect mechanical properties along the angle of alignment. Accordingly, controller 22 (referring to FIG. 1) may be programmed to initiate the counterrotation of head 16 at different angles around the perimeter of structure 12. In one embodiment, the counterrotation of head 16 is randomized. In another embodiment, the counterrotation of head 16 is controlled to alternatingly occur at opposing sides of structure 12 and at locations that are incrementally offset from previous counterrotation locations.

Similarly, during printing of structure 12 (cylindrical or otherwise), the continuous reinforcement being discharged by outlet 26 may need to be periodically severed and re-anchored between layers. If the severing and/or re-anchoring locations align between layers of structure 12, undesired discontinuities can again be created within structure 12. Accordingly, controller 22 may be programmed to initiate severing and/or re-anchoring at locations that do not align between layers (e.g., in a randomized or controlled manner).

It has also been found that, when fabricating cylindrical structures utilizing continuous reinforcements, outlet 26 may be stepped upward in an axial direction between layers. While this step-up location may not be distributed throughout structure 12 to inhibit alignment (e.g., with severing and re-anchoring the reinforcement), a geometry of the step-up may be controlled to reduce a magnitude of the associated discontinuity. For example, rather than a square-shaped step being used to join overlapping layers, a ramped or helical step may be implemented. That is, instead of stopping horizontal travel of outlet 26, incrementing the position of outlet 26 axially, and restarting horizontal travel, controller 22 may be caused to axially increment outlet 26 during termination of horizontal travel on a base layer and initiation of horizontal travel on an overlapping layer.

In another embodiment, head 16 may be controlled to discharge layers of a cylindrical structure within a plane that is oblique relative to an axis of outlet 26. In this manner, all movements of outlet 26 may be helical and no axial stepping may be required. This may, however, necessitate initial anchoring on a build surface that is itself helical. In these applications, terminal ends of structure 12 may require post-machining to bring them back to perpendicular orientation relative to an axis of structure 12.

The disclosed system may have improved reinforcement wetting. Wetting may be improved via precise control over the amount of matrix applied to the reinforcement during travel through extension 28 to outlet 26.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A head for an additive manufacturing system, comprising:
   a first outlet configured to discharge, from the head, a composite material comprising a first component and a second component to form an object;
   a first inlet located upstream the first outlet and configured receive at least one component of the composite material; and
   a second outlet located between the first outlet and the first inlet, wherein the second outlet is configured to discharge, from the head, only the first component of the composite material.

2. The head of claim 1, further including wherein the first component of the composite material is a matrix and the second component of the composite material a continuous fiber.

3. The head of claim 1, further including a second inlet upstream of the first inlet and configured to receive at least the second component of the composite material, wherein the second component is different than the first component.

4. The head of claim 3, further including a third outlet configured to discharge only the first component of the composite material.

5. The head of claim 4, wherein the third outlet is between the first and second inlets.

6. The head of claim 4, wherein:
   the first component is a liquid; and
   the second component is a continuous reinforcement.

7. The head of claim 6, wherein the continuous reinforcement is at least partially coated with the liquid at a location downstream of the first inlet and upstream of the second outlet.

8. The head of claim 1, further including a third outlet configured to discharge the first component of the composite material.

9. The head of claim 8, wherein the third outlet is between the first and second inlets.

* * * * *